United States Patent [19]

Engding et al.

[11] Patent Number: 5,156,803
[45] Date of Patent: Oct. 20, 1992

[54] APPARATUS FOR INSPECTION OF A REACTOR VESSEL

[75] Inventors: Alf E. C. Engding, Akersberga; Alf R. Karlsson, Taby, Sweden

[73] Assignee: Niagara Mohawk Power Corporation, Syracuse, N.Y.

[21] Appl. No.: 660,669

[22] Filed: Feb. 25, 1991

[51] Int. Cl.⁵ .......................................... G21C 17/013
[52] U.S. Cl. .................................... 376/249; 376/245; 73/622; 73/623
[58] Field of Search ................... 376/245, 249, 252; 73/622, 623

[56] References Cited

U.S. PATENT DOCUMENTS

| | | | |
|---|---|---|---|
| 3,824,843 | 7/1974 | Gebeshuber et al. | 73/71.5 |
| 4,166,395 | 9/1979 | Dannehl | 73/634 |
| 4,436,694 | 3/1984 | Vassalotti et al. | 376/310 |
| 4,501,716 | 2/1985 | Engding | 376/249 |
| 4,585,610 | 4/1986 | Andersson et al. | 376/249 |
| 4,867,168 | 9/1989 | Stoor et al. | 128/653 |
| 4,986,953 | 1/1991 | Bernhard | 376/245 |
| 4,988,475 | 1/1991 | Guironnet | 376/248 |

FOREIGN PATENT DOCUMENTS 2726547 12/1978 Fed. Rep. of Germany ...... 376/249
2000854 1/1987 Japan ................................... 376/249
0010915 3/1990 Japan ................................... 376/245

OTHER PUBLICATIONS

Chapman, Terry L., "GE's New Inspection system gives Inside Information on BWR RPV Welds," Nuclear Engineering International, Dec. 1990, pp. 41–42.

Primary Examiner—Brooks H. Hunt
Assistant Examiner—Chrisman D. Carroll
Attorney, Agent, or Firm—Heslin & Rothenberg

[57] ABSTRACT

An apparatus for inspection of a reactor vessel includes trolley supporting an axillay extending support mast and extension mast. The support mast has a tilting device to adjust the angle between the support mast and vessel wall to allow the extension mast to be accessible to lower portions of the reactor vessel. The lower part of the extension mast is connected to a rack having a horizontal trolley capable of tangential movement relative to the reactor vessel wall. The horizontal trolley also is connected to a probe position trolley enabling a probe holder to move tangentially relative to the horizontal trolley. The apparatus enables the probes to move radially and axially for greater access to positions of the reactor vessel wall.

22 Claims, 13 Drawing Sheets

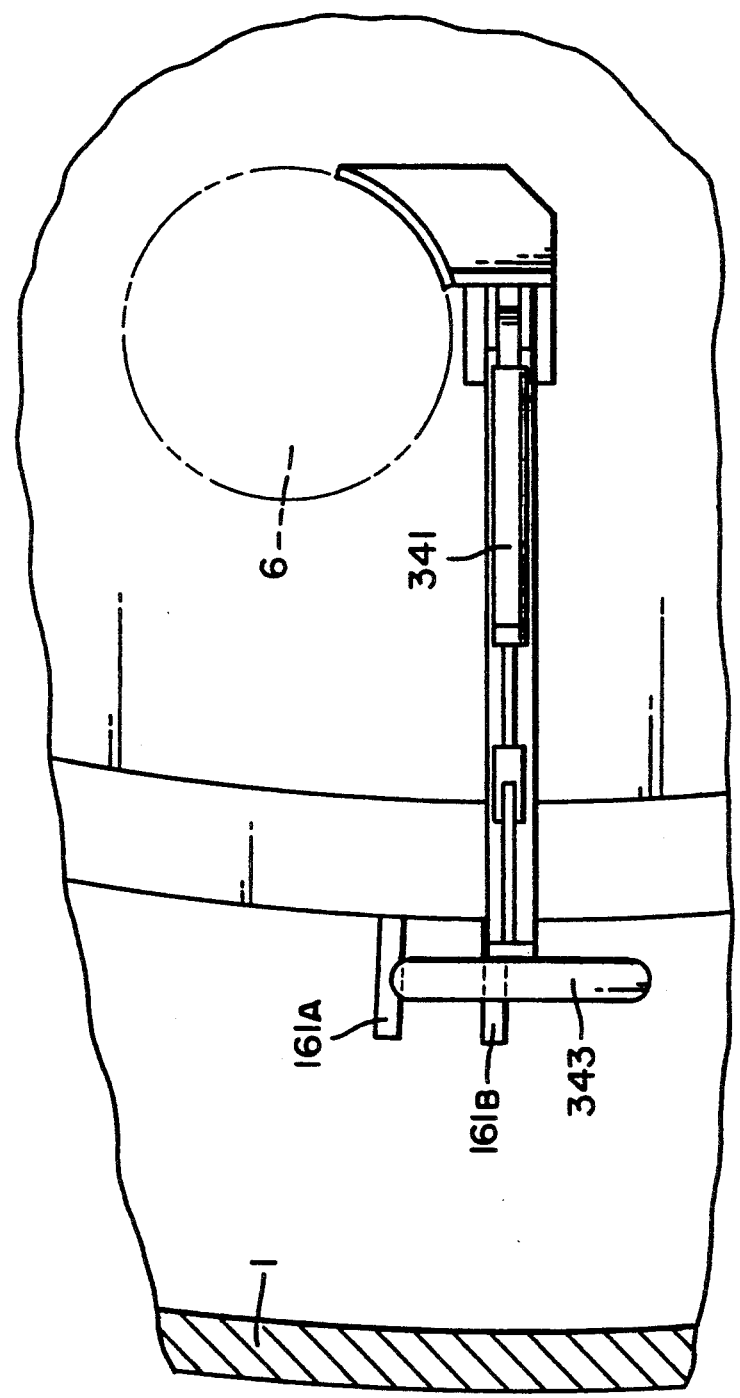

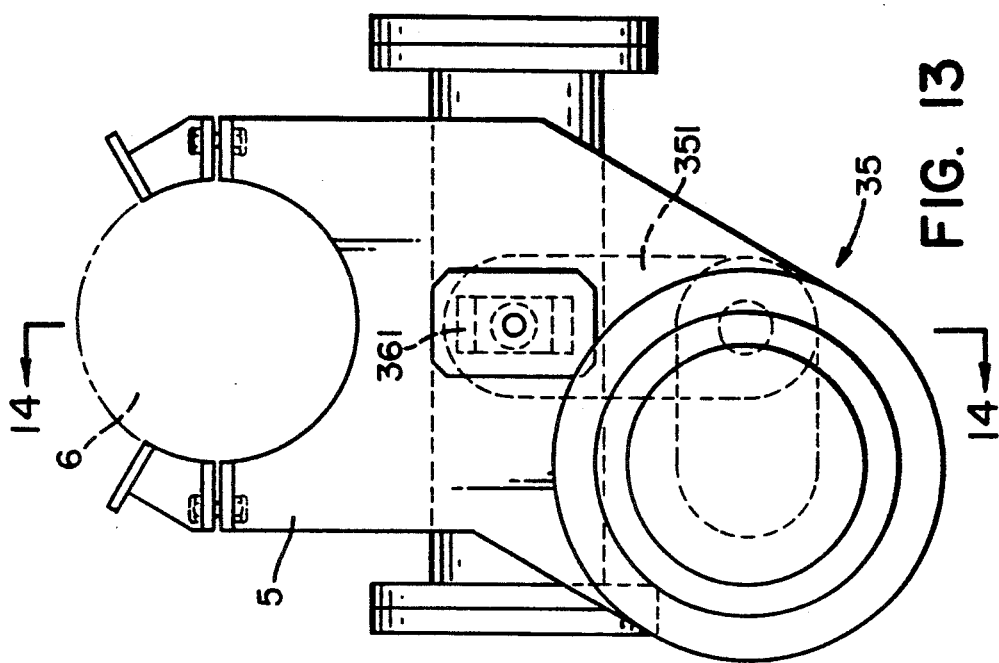
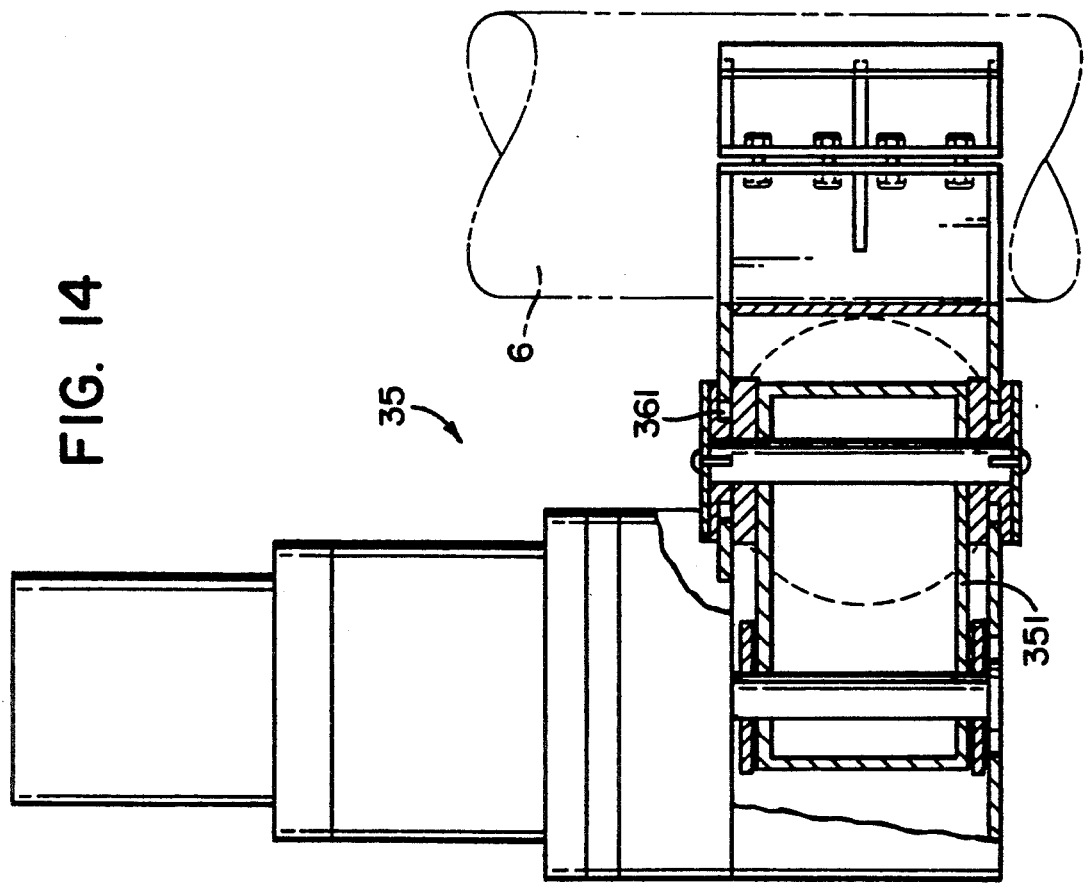

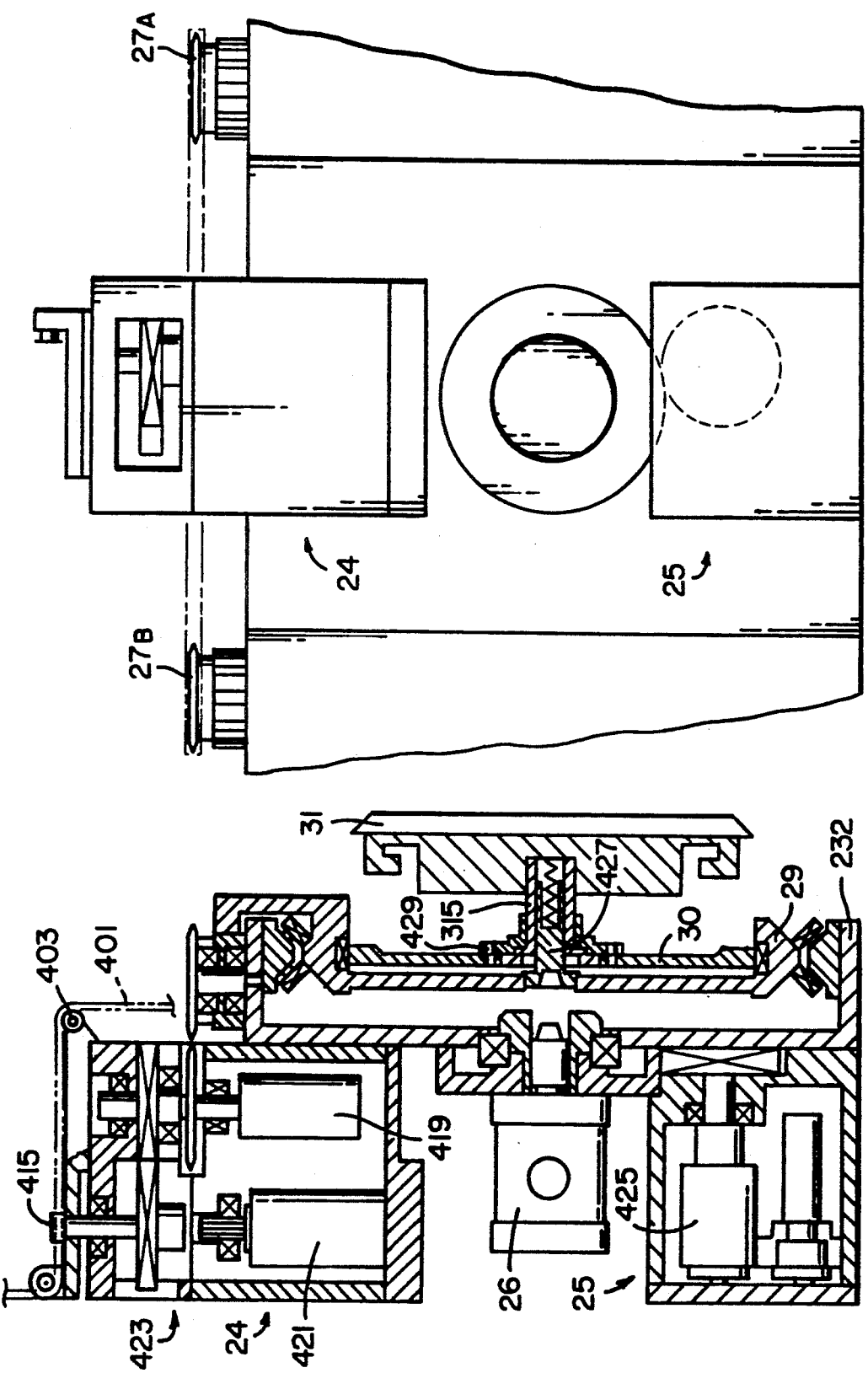

APPARATUS FOR INSPECTION OF A REACTOR VESSEL

BACKGROUND OF THE INVENTION

The present invention relates to reactor vessels with a reactor core enclosed in a core shroud and more particularly, to an apparatus for inspection of a reactor vessel.

Inspection of the interior of a reactor vessel typically includes the systematic inspection of weld joints in the reactor vessel and pipe sockets etc. Usually, an end effector comprising inspection members in the form of, for example, cameras, ultrasonic probes or the like is moved into the reactor vessel with the aid of special devices. These devices generally include a trolley, which is movable on the exposed upper flange of the vessel, provided with traversing wheels and a drive means. The trolley supports a support mast which is immersed into the reactor vessel substantially parallel to the vertical axis of the reactor vessel. The support mast supports the end effector which may be moved with the aid of a drive member.

The device disclosed in U.S. Pat. No. 4,585,610, is well known in the art and includes a trolley with three or four wheels, which supports a support mast centrally insertable in the reactor vessel. Inspection of the vessel wall weld joints is accomplished by means of ultrasonic probes, which make contact with the vessel wall. However, the inspection depth is often limited by reactor components located at the wall of the vessel such as feed water spargers and/or core spray spargers which are not normally dismantled during inspection. Consequently, using this inspection technique weld joints and reactor components located towards the bottom portion of the reactor vessel are not accessible to inspection.

It is also well known in the art to place the ultrasonic probes on an extension mast which is fixed to the lower part of the support mast and movable in the radial direction of the vessel. However, the support mast is lowered into the reactor vessel at such a large distance from the its wall that the support mast and the extension mast clear the feed water spargers. When the extension mast has cleared the spargers, the extension mast, by means of the trolley, is moved radially towards the vessel wall below the feed water spargers and also below any core spray spargers which may exist. Although this technique permits a certain increase in the available inspection depth, the inspection depth is limited by the fact that the extension mast cannot be made longer than the axial distance between the feed water spargers and the core shroud cover. In order for the extension mast of this conventional system to clear the feed water spargers, the extension mast must protrude within the annular space formed by the projection of the core shroud cover and the vessel wall. However, the extension mast can only be inserted into the reactor vessel to a point where it contacts the core shroud cover. Therefore, particularly in reactor vessels in which the distance between the core spargers and core shroud cover is relatively short, the space between the reactor vessel and the core shroud which is available for inspection is limited with use of the conventional inspection system.

It is therefore an object of the present invention to provide an apparatus for inspection of a reactor vessel which is capable of being inserted into the lower portion of the annular space between the core shroud and the wall of the reactor vessel.

It is also an object of the present invention to provide a reactor inspection apparatus which enables inspection of a greater area of the reactor vessel by providing for increased radial, tangential and axial movement of the end effector relative to the reactor vessel wall.

SUMMARY OF THE INVENTION

The aforementioned objects and advantages are achieved through use of the apparatus for inspection of a reactor vessel in accordance with the present invention. Compared with prior art devices, a device according to the present invention may increase the accessible part of the length of those weld joints which are positioned below the feed water spargers.

The apparatus for inspection of a reactor vessel includes a support mast, a trolley for supporting the support mast to the wall flange of a reactor vessel and transporting the support mast along the inside side wall of the reactor vessel, an extension mast capable of vertically extending below the support mast, the extension mast being translated by means of a second trolley engaged between the extension mast and the support mast, an end effector means connected to the lower portion of the extension mast for inspecting the reactor vessel wall, and a tilting device connected to the support mast for varying the angle between the support mast and the reactor vessel wall.

The tilting device may include an arm attached to the support mast, the arm being capable of being radially moved by a means for altering the angle between the support mast and the vessel wall. The means may include a compressed air cylinder. The tilting device may also include a support wheel connected to the arm for contacting the reactor vessel wall.

The end effector may include a main frame, an upper drive device connected to the main frame, a lower drive device also connected to the main frame, a horizontal trolley affixed to a rack operatively connected to the upper drive device and capable of tangential movement relative to the main frame, a probe position trolley affixed to the horizontal trolley, and a probe holder capable of securing ultrasonic probes affixed to the probe position trolley by a shaft.

The end effector may also comprise means for unlocking the probe holder from the probe position trolley to allow relative movement between the probe holder and probe position trolley. The means may include means for activating a spring loaded locking pin interfaced with the shaft, and a lower drive device adapted to rotate the probe position trolley around the shaft to unlock or lock the shaft from the horizontal trolley.

The upper drive device may include an electric motor, a gear box operatively engaged with the motor, and a chain transmission means operationally engaged to the gear box and one or more gear wheels to displace the rack in the tangential direction.

The apparatus may further include a support arm connecting the end effector means to the extension mast, a spring loaded bearing connecting the support arm to the extension mast for continuously applying a torque forcing the end effector means in a direction radially towards the reactor vessel wall, and means for forcing the end effector means in a direction radially opposite the reactor vessel wall. The means may be a compressed air cylinder.

The apparatus may also include a locking pin affixed to the main frame and insertable into an aperture located on a front plate of the probe position trolley wherein the probe position trolley may be locked to the main frame when the pin is inserted into the aperture.

Also, a rope affixed to the horizontal trolley and passing through a hole in an output shaft of the gear box of the upper drive device may be included, wherein applying a tension to the rope enables the horizontal trolley to be moved to a central position.

The apparatus may further include a tangential direction fine positioning system and/or a radial direction fine positioning system comprising a rotatable member affixed to the trolley.

The tangential direction fine positioning system may include a positioning arm pivotably affixed to the lower portion of the support mast, means for pivotably moving the position arm in an axial direction, and a distance measuring device affixed to the positioning arm for measuring the distance to a lug on the shroud of the reactor. The means may include a compressed air cylinder.

The radial direction fine positioning system may include a nozzle within the member capable of radially displacing a beam relative to the member, the nozzle being affixed to the support mast.

The apparatus may further include a simulation block located at the lower portion of the support mast for verifying the accuracy of probe on the probe holder.

The apparatus, with the simulation block, may also include an arm pivotably affixed to the support mast, means for pivotably moving the arm from a retracted position to a verification position, and a simulation block holder located at the end of the arm for supporting the simulation block. The means may include a compressed air cylinder to cause the arm to extend into the verification position such that the simulation block will interface with the probes of the end effector for verification of the probes.

The end effector may comprise a horizontal trolley for movement of the inspection members in a tangential direction in relation to the extension mast. This is particularly advantageous in those cases where, for example, jet pumps are placed in the gap between the reactor vessel and the core shroud since it makes possible inspection of at least parts of those weld joints which are situated between the jet pumps and the vessel wall.

Other advantageous further developments of the invention will be clear from the following description and the appended claims.

BRIEF DESCRIPTION OF THE DRAWINGS

The invention will be explained in greater detail by way of reference to the drawings, wherein, corresponding elements are designated with like reference numerals in the different figures:

FIG. 12 depicts a top view of the tangential direction fine positioning device according to FIG. 11;

FIG. 13 depicts a top view a radial direction fine positioning device useable in the apparatus in accordance with the present invention;

FIG. 14 depicts a sectional view, along the line XIV—XIV, of the radial direction fine positioning device depicted in FIG. 13;

FIG. 17 depicts a sectional view from the side of an end effector including the details of the gearing and drive systems; and FIG. 18 depicts a sectional view from the rear of the end effector depicted in FIG. 17.

DETAILED DESCRIPTION

In the following description, the terms "axial", "radial" and "tangential" are used to refer to directions relative to the reactor vessel. "Axial direction" relates to a direction parallel to the axis of the reactor vessel, "radial direction" relates to a direction from the center of the reactor vessel towards the wall thereof perpendicular to the axial direction, and "tangential direction" relates to a direction perpendicular to the axial as well as the radial direction. The terms "upper", "lower", "upwards" and "downwards" also relate to the reactor vessel, assuming that the reactor vessel has its axis oriented vertically to the opening at the upper part of the reactor vessel.

Figure 2:
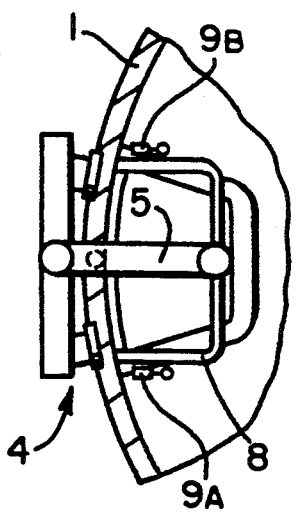
FIG. 2 depicts a top view of prior art device according to FIG. 1.
Figure 1:
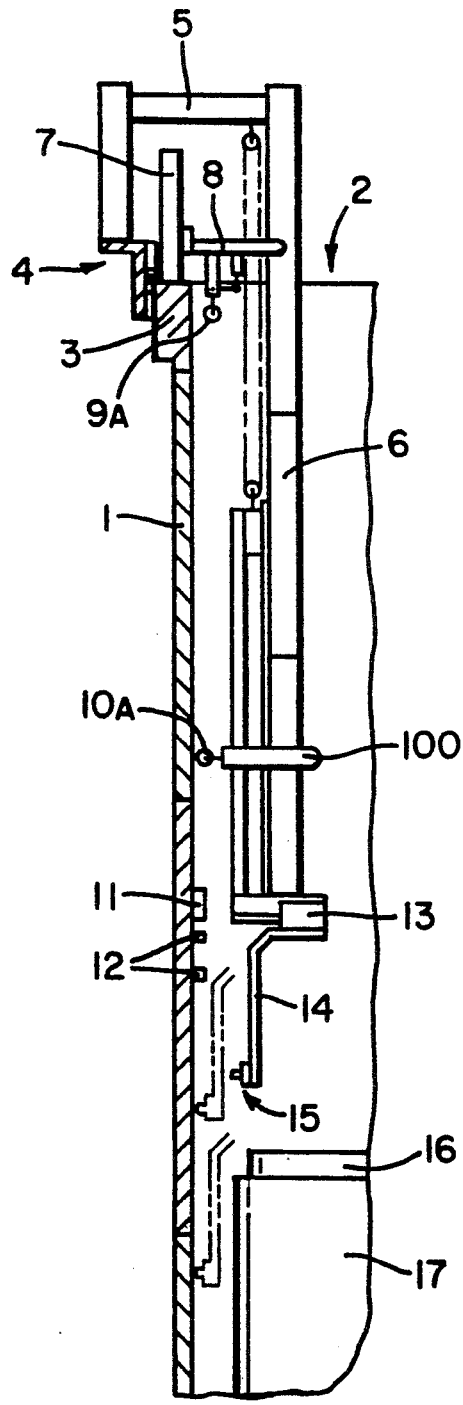
FIG. 1 depicts a side view of the prior art inspection apparatus in relation to the upper part of a reactor vessel wall.

FIGS. 1 and 2 show a prior art device of the kind disclosed in the background of the invention mounted on a reactor vessel having its cover removed. Typically, the upper part of a wall of a substantially cylindrical reactor vessel 1 is immersed into a water-filled pool (not shown). A flange 3 surrounds the opening 2 of the reactor vessel forming a circular running surface along which an upper trolley 4 can be moved by means of a drive device. The trolley 4 is connected to a distance beam 5 which supports a support mast 6 built of a number of sections and extending substantially parallel to the reactor vessel wall. A support tube 8 affixed to the support mast rests against pin bolts 7 which fasten the reactor vessel cover. Two support wheels 9A, 9B are also mounted on the support tube 8. When the support mast 6 has been moved into the reactor vessel, the support wheels 9A, 9B are moved against the wall of the reactor vessel activation of compressed-air cylinders associated with the support wheels. The support wheels thus fix the radial distance between the upper part of the support mast and the wall of the reactor vessel.

A support arm 100 with two guide wheels 10A, 10B, is located at the lower part of the support mast. With the support arm in extended position, the guide wheels contact the reactor vessel wall. The length of the support arm may be adjusted by means of a compressed-air cylinder to vary the radial distance between the lower part of the support mast and the rector vessel wall. Since the reactor vessel contains non-dismantled feed water spargers 11 and core spray spargers 12, the distance between the guide wheels and support arm is adjusted so that the support mast, which in the rector vessel reaches down to a level just below the feed water spargers 11, may pass radially inside the feed water spargers 11 when inserted into the reactor vessel.

At the lower part of the support mast, a lower trolley 13 is arranged which is movable in relation to the support mast both in the radial and the axial direction. The trolley 13 supports an extension mast 14, which has an end effector 15 comprising an inspection member with probes of ultrasonic type located at its lower portion. The lower trolley is initially in its radially inner position and axially upper position (shown in FIG. 1) when the support mast is inserted into the reactor vessel so that the extension mast clears the feed water spargers 11. When the lower part of the support mast 6 has cleared the feed water spargers 11, the lower trolley 13, as indicated in dashed lines in FIG. 1, may be moved outwards in the radial direction under the feed water spargers to a position where the inspection member makes contact with the reactor vessel wall. It is then possible to move the lower trolley in the downward axial direction in the reactor vessel to further increase the interior portion of the reactor vessel which is available for inspection.

However, since the length of the extension mast is limited by the axial distance between the feed water spargers 11 and the cover 16 of a core shroud 17 positioned in the reactor vessel, the lower trolley can only be moved downwards a distance corresponding to the length of the extension mast. Therefore, this apparatus generally does not allow inspection of weld joints located in the lower part of a reactor vessel.

Figure 3:
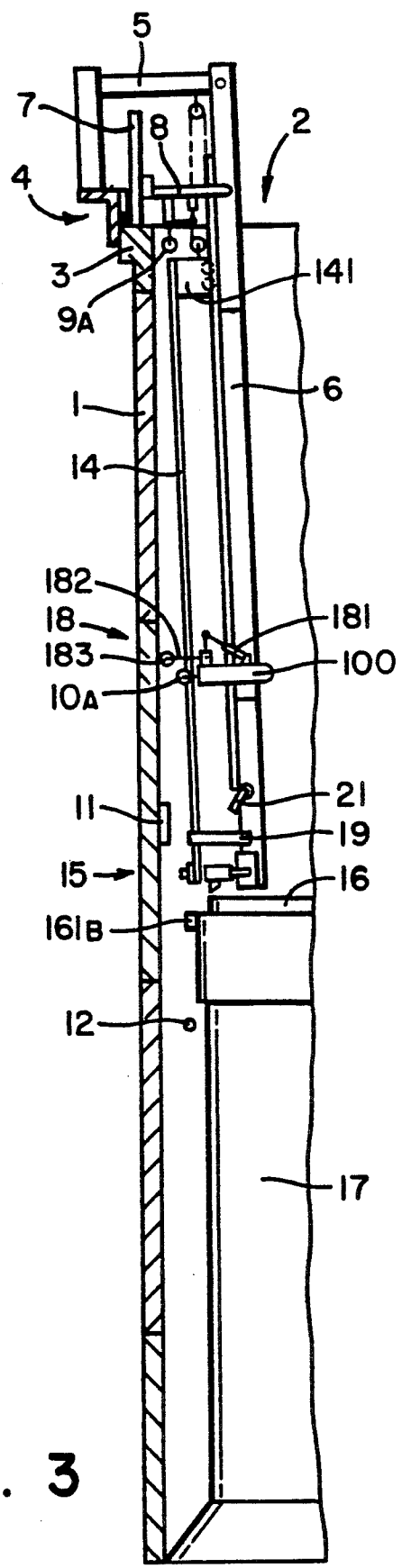
FIG. 3 depicts the apparatus for inspection of a reactor vessel according to the present invention with an end effector in a raised position in relation to a reactor vessel.
Figure 4:
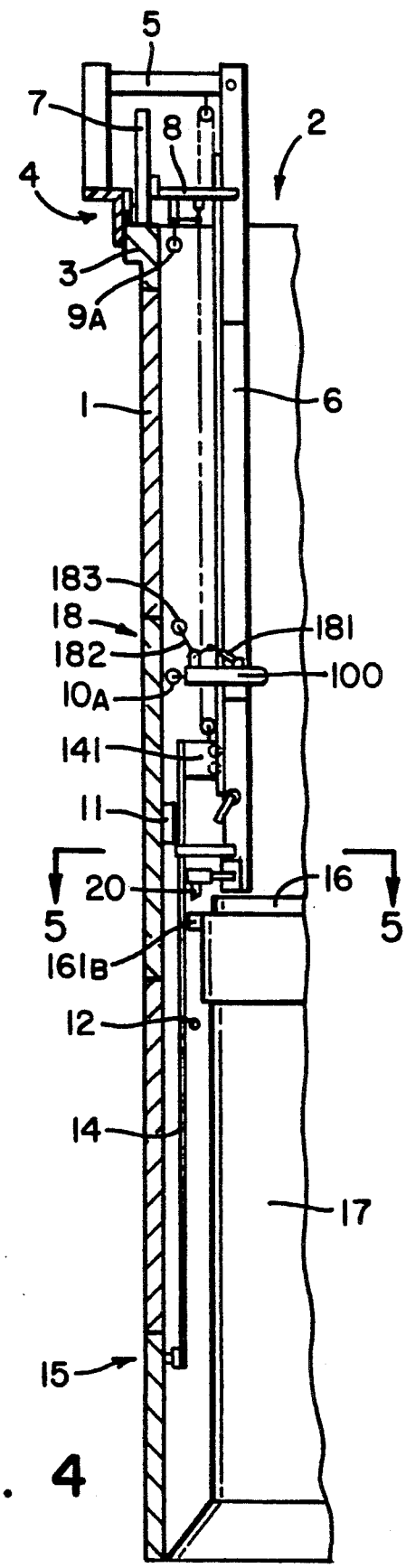
FIG. 4 depicts the apparatus according to the present invention with an end effector in an inspection position in relation to a reactor vessel.

FIGS. 3 and 4 show an apparatus for inspection of a reactor vessel according to the present invention. The apparatus includes a trolley 4 and drive means, as well as a support mast 6 mountable to the reactor vessel wall in the same manner as the prior art. However, the apparatus contains many additional features.

A tilting device 18, which is connected to the support arm 100, includes an arm 182 having a support wheel 183. The angle of the support mast 6 relative to the reactor wall is adjusted by a compressed-air cylinder 181 connected to the support mast 6 and support arm 100. A vertical trolley 141 is affixed to the upper part of an extension mast 14. This trolley 141 is movable along the support mast 6 via a chain, as suggested in the FIGS. 3 and 4. A mast guide 19 is arranged at the lower part of the support mast to guide the extension mast during its axial movement. A surveillance camera 21, shown in FIG. 3, is mounted at the lower part of the support mast to visually check that there are no obstacles present when lowering the extension mast down into the reactor vessel. The lower part of the extension mast 14 supports an end effector 15 inspection member with ultrasonic type probes.

At the lower part of the support mast a maneuverable arm comprising a locking device 20, shown in FIG. 4, is connected thereto. The core shroud cover 16 of the reactor vessel contains a number of lugs 161A, 161B arranged in pairs and radially projecting from cover 16. The locking device can be moved down between a pair of the lugs 161A, 161B, by means of a compressed-air cylinder to lock the support mast in a tangential direction to the reactor vessel, as shown in FIG. 5.

Referring again to FIG. 3, when the apparatus is moved into the reactor vessel, the tilting device is in its extended position and the extension mast in its upper position. The support wheel 183 makes contact with the wall of the reactor vessel, and the length of the arm 181 is set to allow the support mast 6 create a sufficiently large enough angle with the reactor vessel wall 1 to allow the end effector 15 to pass by the feed water spargers 11. When the end effector 15 has passed the feed water spargers 11, the tilting device is adjusted to its retracted position to move the end effector radially towards the vessel wall 1.

Referring to FIG. 4, the tilting device 18 is in its retracted position such that the support mast and the extension mast are positioned substantially parallel to the reactor vessel wall and the extension mast has been moved axially downwards along the support mast. The distance beam 5, the support mast 6, the vertical trolley 141 and the extension mast 14 are dimensioned to allow the extension mast to pass through the annular shaped area below the feed water spargers and between the vessel wall 1 and the core shroud cover 16. In this position the inspection member may contact the vessel wall. Therefore, the length of the extension mast and the region available for inspection in the axial direction below the feed water spargers 11 is not dependent on the axial distance between the feed water spargers 11 and the core shroud cover 16.

Figure 5:
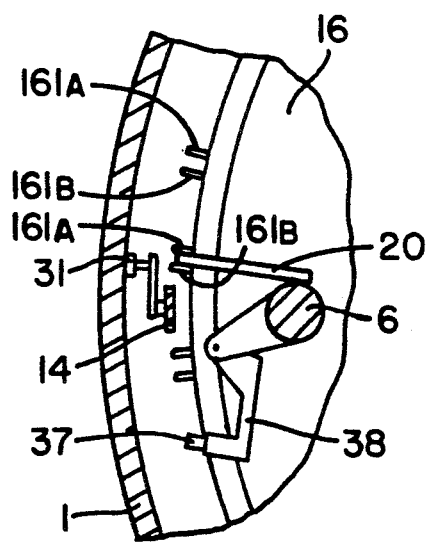
FIG. 5 depicts a sectional view of the apparatus depicted in FIG. 4 along the line V—V.
Figure 6:
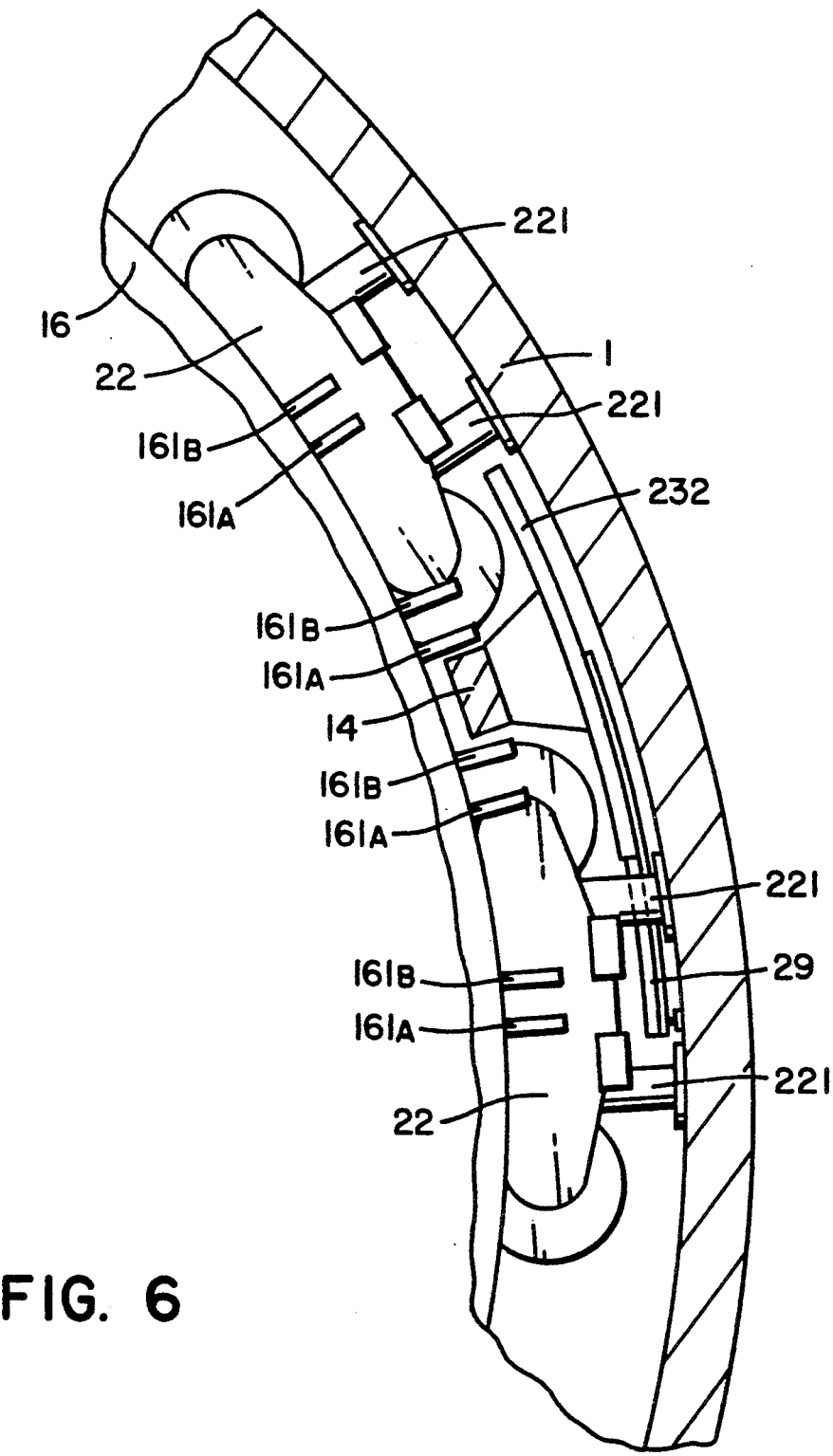
FIG. 6 depicts a portion of a reactor vessel wall containing two jet pumps.

The space available for the insertion of the extension mast 14 into the gap between the reactor vessel wall 1 and the core shroud 16, (projected on a plane perpendicular to the axis of the vessel, as shown in FIG. 5), is greatly restricted. In the radial direction, the outer boundary line of the available space consists of the projection of the feed water spargers 11 in the plane while the inner boundary lines consist of either the core shroud 16 or the core spray spargers (not shown). In the tangential direction, the boundary lines, consist of the projections of the lugs 161A, 161B on the core shroud cover. The available space may typically consist of part of a circular ring with a radial extension of about 70 mm and a length in the tangential direction of 330 mm. Also, in certain reactors, jet pumps 22, as shown in FIG. 6, are positioned in the gap between the reactor vessel wall 1 and the core shroud. The upper part of these jet pumps 22 are usually located at a level below the core shroud cover and are normally secured to the reactor vessel wall by brackets 221. Therefore, a device with an end effector 15 fixed to the extension mast 14 cannot reach all parts of a tangentially extending weld joint.

Figure 7:
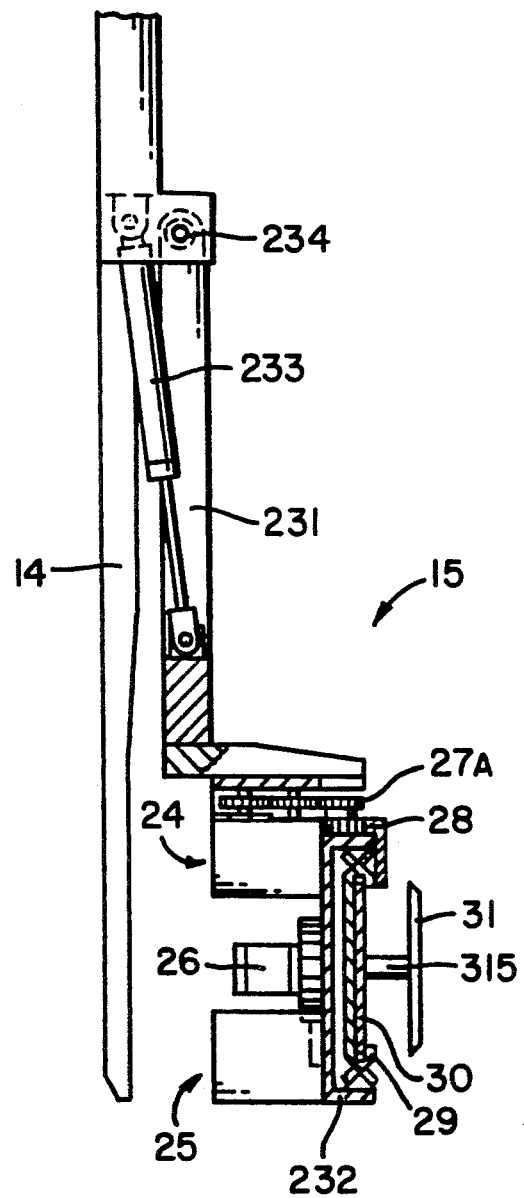
FIG. 7 depicts a side view of an end effector of the apparatus for inspection of a reactor vessel according to the present invention.
Figure 8:
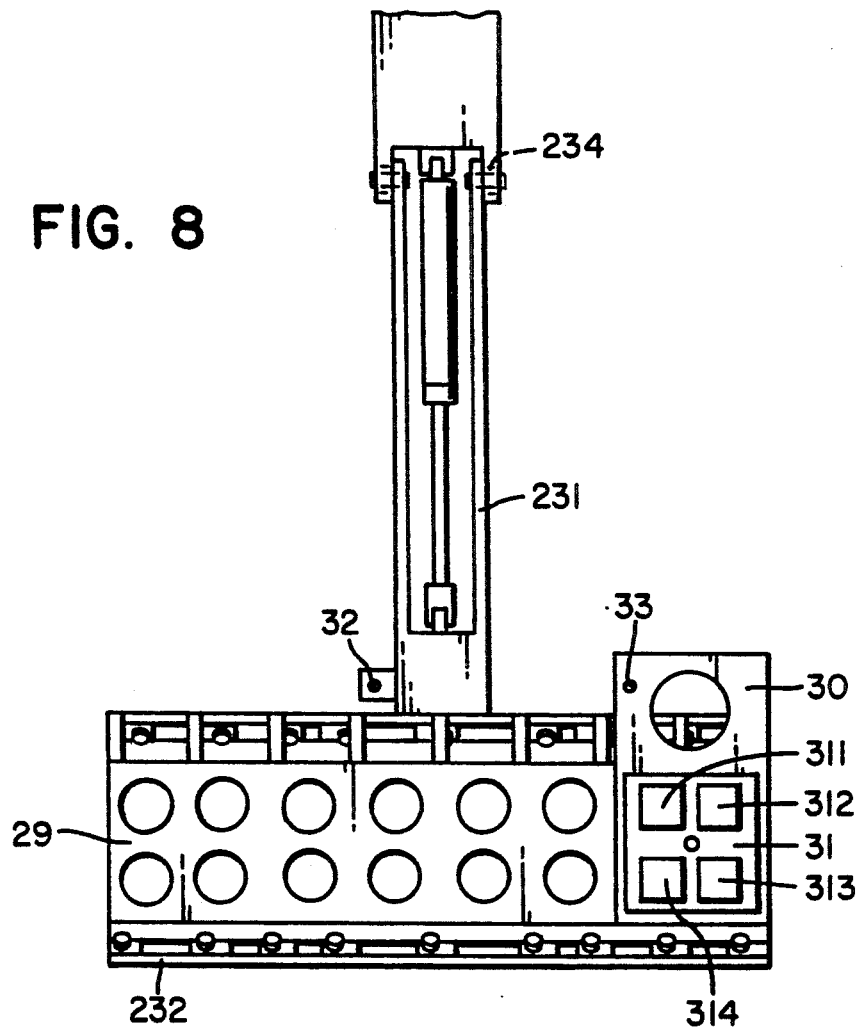
FIG. 8 depicts an end effector as seen in a radially inward direction.
Figure 9:
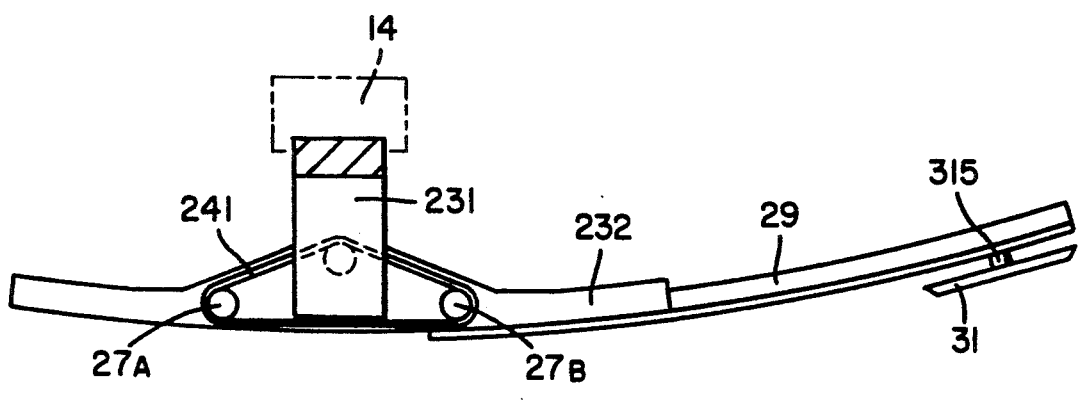
FIG. 9 depicts a top view of an end effector with a probe position trolley in a run-out or extended position.

FIGS. 7-9 show the lower part of the extension mast 14 with an end effector 15 affixed thereto by means of a flexible support arm 231. Referring to these Figures, a main frame 232 is affixed to the lower part of the support arm 231. Associated with the main frame is an upper drive device 24, a lower drive device 25 and a compressed-air cylinder 26. The upper drive device 24 includes an electric motor 419, an incremental position transducer 421 and a gear box 423 (shown in detail in FIG. 17). Referring to FIG. 9, the upper drive 24 drives a chain 241 connected to two gear wheels 27A, 27B within the main frame 232, to displace a rack 28 which is movable in the tangential direction relative to the main frame 232. A horizontal trolley 29, affixed to rack, may be translated from a central position, where its central line is located opposite to the central line of the extension mast (shown in FIG. 8), to outer positions on either side of the central line of the extension mast (shown in FIG. 9) by activating the upper drive device 24. As shown in FIG. 8, circular holes have been provided in the horizontal trolley and the probe position trolley to reduce their weight.

Referring to FIGS. 8 and 9, a probe position trolley 30 functions to move the probe holder tangentially relative to the horizontal trolley. The probe position trolley 30 is initially locked in position to the horizontal trolley 29 and supports a probe holder 31 to which four ultrasonic type probes 311, 312, 313, 314 are resiliently clamped. The probe position trolley 30 and the probe holder 31 are fixed to each other by means of a shaft 315 which is controlled by the lower drive device 25. A compressed-air cylinder 233, operatively connected the support arm 231, allows the support arm to be rotated around the bearing 234 inwards towards the extension mast. The lower drive device 25, shown in detail in FIG. 17, includes an electric motor 425 which is adapted to activate a compressed-air cylinder 26 and rotate the probe position trolley around the shaft 315 to temporarily unlock the shaft from the horizontal trolley 29.

Referring again to FIG. 7, the main frame 232 can be adjusted in a radial direction where the probe holder 31 does not make contact with the reactor vessel wall. The bearing 234 is spring-prestressed to apply a constant counterclockwise torque to the support arm. Therefore, when the compressed-air cylinder 233 is deactivated, the support arm 231 pivots away from the extension mast 14 to a position where the probe holder 31 makes contact with the reactor vessel wall 1.

Referring to FIG. 3, when the apparatus is lowered down into the reactor vessel, the tilting device 18 of the support mast 6 is in an extended position, the probe holder 31 is in the retracted position and the extension mast 14 is in the upward position along the support mast 6. Furthermore, the horizontal trolley is in its central position. The end effector is then allowed to pass in a radial direction inside the feed water spargers 11 whereupon the tilting device 18 is retracted. The extension mast 14 may now be lowered further, for example, to a level below the upper brackets of the jet pumps, allowing the main frame 232 to pass between the brackets (as shown in FIG. 6). When the desired level has been reached, the compressed-air cylinder 233, shown in FIG. 7, is deactivated, causing the support arm 231 to be moved by the spring loaded bearing 234 against the vessel wall 1 so that the probe holder will make contact with the vessel wall with a predetermined contact pressure suitable for proper functioning of the probes. The horizontal trolley 29 can now be moved, as indicated in FIG. 9, for example, from its central position in a counterclockwise direction. The probe position trolley 30 and the probe holder 31 will move with the horizontal trolley 29 for inspection of, for example, a horizontally extending weld joint in the vessel. The weld joint can then be scanned for inspection in a clockwise direction.

Figure 10:
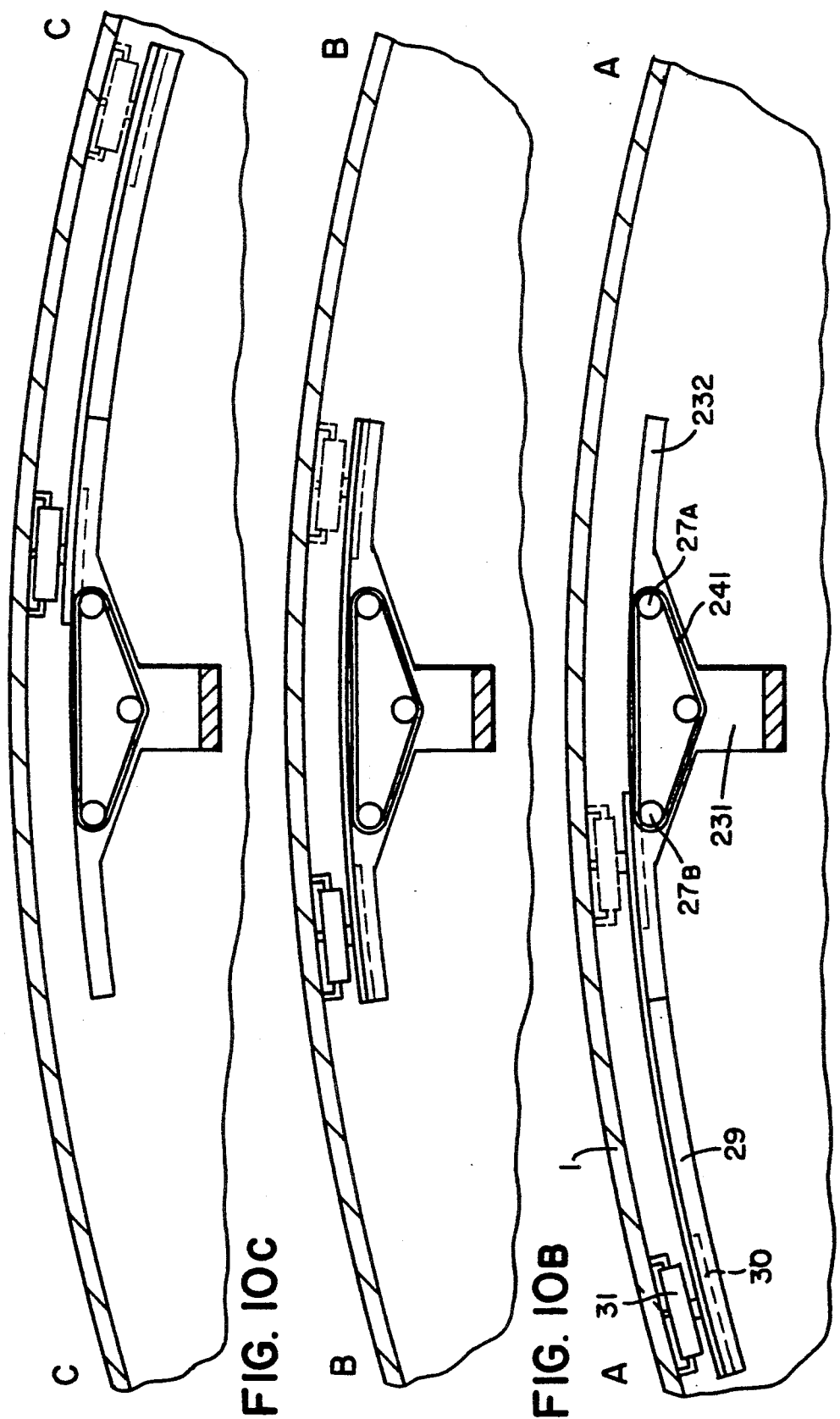
FIGS. 10A–10C depict three top views of an end effector having a probe holder in different positions relative to a probe position trolley and relative to a main frame.

To provide the probe holder 31 with maximum reach in either tangential direction relative to the extension mast 14, the probe position trolley 30 may also be moved tangentially relative to the horizontal trolley 29. FIGS. 10A-C show various positions of the horizontal trolley 29 relative to the main frame 232 and multiple positions of the probe position trolley relative to the horizontal trolley 29. The wall 1 of the reactor vessel is marked in each of the three situations by the circular arcs A—A, B—B and C—C, respectively.

Description of the scanning procedure will be described assuming that scanning of the reactor vessel wall is first performed when the horizontal trolley is situated to the left of the central position, as shown in FIG. 10A, and the probe position trolley 30 is located at the lefthand edge of the horizontal trolley. First, when the horizontal trolley has reached its outer lefthand end position (shown arc A—A), it is moved back to central position as shown in FIG. 10B (arc B—B), while scanning is performed. The probe position trolley 30 is then moved from the lefthand edge of the horizontal trolley to the righthand edge of the horizontal trolley. While scanning, the horizontal trolley is then moved from the central position to the position shown in FIG. 10C (arc C—C).

The movement of the probe position trolley 30 relative to the horizontal trolley 29 is carried out in three steps. Initially, the probe position trolley 30 is locked to the left hand edge of the horizontal trolley 29. From the position shown in FIG. 10A, the horizontal trolley 29 is moved clockwise so that the center of the probe position trolley 30 is aligned with the center line of the extension mast 14. Thereafter, a push pin 32, as shown in FIG. 8, is activated with the aid of a compressed-air cylinder (not shown). The push pin passes through the hole 33 in the front plate of the probe position trolley 30 thus locking the probe position trolley 30 to the main frame. In the next step, the horizontal trolley 29 is unlocked from the probe position trolley 30 by activation of the compressed-air cylinder 26 (FIG. 7) which displaces a spring-loaded locking pin 427 (FIG. 17) arranged in the shaft 315. The probe position trolley 30 is then rotated 45° around the shaft 315 by the lower drive device 25. The compressed-air cylinder 26 is now deactivated, the spring-loaded locking pin partially returns to its original position and the probe position trolley 30 remains disengaged from the horizontal trolley 29. The horizontal trolley 29 is then moved counterclockwise, by means of the upper drive device 24, until the probe position trolley 30 is positioned at the righthand edge of the horizontal trolley 29. At this time, the compressed-air cylinder 26 is activated to displace the spring-loaded locking pin 427 and the lower drive device 25 rotates the probe position trolley 45° back to its original position. The compressed-air cylinder 26 is deactivated and the spring loaded locking pin 427 completely returns to its original position locking the probe position 30 trolley to the horizontal trolley 29. Finally, the push pin 32 is deactivated so that the probe position trolley 30 is disengaged from the main frame 232. The effector 15 may be moved to inspect the righthand part of the vessel wall with maximum reach. Although the probe position trolley may be moved relative to the horizontal trolley, the area of the vessel wall which is directly in front of the main frame may be inspected with the probe position trolley in either lefthand or righthand positions.

The present invention allows inspection with ultrasonic probes even when the probe holder is to be rotated about its axis in steps of 90° in accordance with certain inspection patterns. This rotation is performed by the following steps. The horizontal trolley 29 is moved so that the center of the probe position trolley 30 is opposite center of the extension mast. In the next step, the horizontal trolley is unlocked from the probe position trolley 30 by the compressed-air cylinder 26 displacing the spring-loaded locking pin 427, as mentioned supra. The probe position trolley is rotated 90° by lower drive device 25, the compressed-air cylinder 26 is deactivated and the spring-loaded locking pin 427 completely returns to its original position locking the probe position trolley to the horizontal trolley. The angular position of the probe position trolley 30 relative to the horizontal trolley 29 is locked by four guide pins 429 (shown in FIG. 17) passing into slots provided in the hub of the probe position trolley. The guide pins 429 may be inserted in the slots when the spring-loaded locking pin 427 returns to the lock position.

If jet pumps 22 are positioned between the core shroud 16 and the reactor vessel wall 1, the apparatus allows the region below and between the upper brackets of the jet pumps to be available for inspection. As is shown in FIG. 6, the brackets 221 of the jet pumps 22 prevent the end effector 15 from being raised out of the reactor vessel when the horizontal trolley 29 is in extended position below these brackets 221. However, when the horizontal trolley 29 is not extended, the end effector 15 may be raised between the brackets 221.

The horizontal trolley 29 includes a completely mechanical system for manually returning the horizontal trolley to its central position in case of a fault in the upper drive device 24. A rope 401 shown in FIG. 17, affixed to the horizontal trolley 29 passes through a turntable at the edge of the main frame 232 and then passes through a hole bored through the gear box output shaft end 415 in the upper drive device 24 in a plane perpendicular to the shaft end. The rope also passes over other turntables (not shown) along the extension mast. The end of the rope is affixed an eye accessible from the opening of the reactor vessel. If a fault is determined in the upper drive device 24. A tool mounted on a rod may be lowered down to engage the eye. Initially, the tension in the rope may not be able to overcome the friction of the gear box and drive device. When the rod is raised, the tension will, however, displace the shaft end in an axial direction, via the hole bored in the output shaft end of the gear box, disengaging the gear box and the chain transmission 421 with the gear wheels 27A, 27B. Continued pulling of the rope will now result in the horizontal trolley 29 being pulled in towards its central position. The position transducer of the drive device 24 remains mechanically connected to the chain transmission 24 and the movement of the horizontal trolley 29 by means of the rope may continue until the position transducer indicates that the horizontal trolley is in its central position. When the pulling of the rope ceases, the shaft end is returned to its original position by a spring device (not shown).

Since the apparatus may be required to extend 70 mm in the radial direction and 330 mm in the tangential direction of the support mast length may typically be about 5 m, the apparatus includes a radial direction fine positioning system and a tangential direction fine position system. Particularly in case of in-situ constructed reactor vessels which may exhibit irregularities on their inner walls, it may be necessary to additionally fine position the extension mast 14 to facilitate optimum contact of the probe holder 31 or to prevent the mast 14 from interfering with parts of the reactor vessel wall 1.

Figure 11:
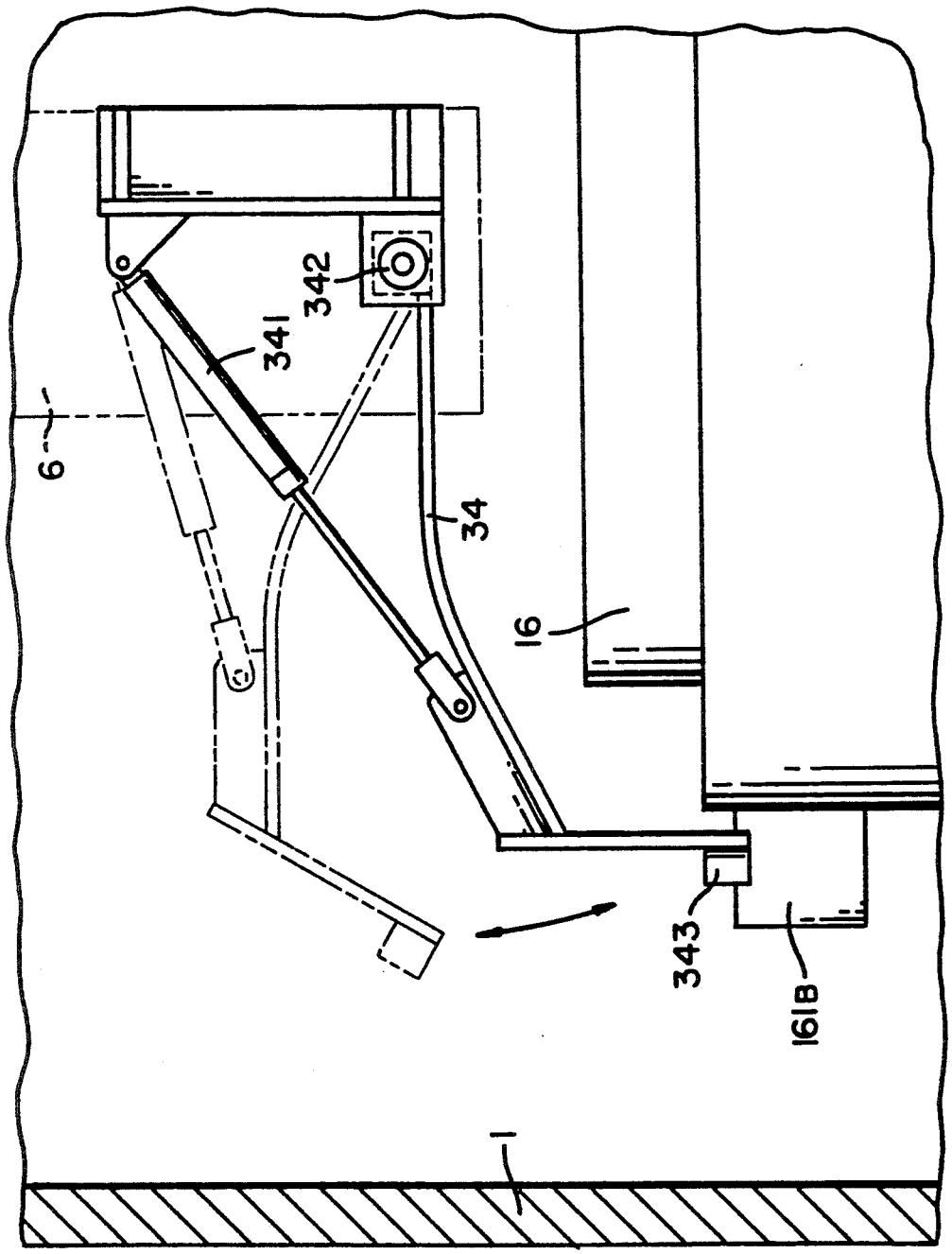
FIG. 11 depicts a side view of a tangential direction fine positioning device useable in the apparatus in accordance with the present invention.

FIG. 11 shows a side view of the tangential direction fine position system and FIG. 12 shows the system from viewed above. A positioning arm 34, arranged at the lower part of the support mast, may be rotated about a bearing 342 by activation of a compressed-air cylinder 341 in an axial plane. An inductive type distance measuring device 343 is fixed to the positioning arm. The tangential positioning is performed by rough positioning the support mast 6, with the extension mast 14 in its upper position and the position arm 34 in an upper position, as shown by the broken line in FIG. 11. The position transducer system connected to the trolley 4 enables the positioning of the arm 34 to be safely within the available area in the tangential direction. In the next step, the compressed-air cylinder 341 is activated causing the arm 34 to be moved to a position, as shown by the unbroken line in FIG. 11, where the distance measuring device 343 is able to measure the distance to a lug 161B on the core shroud. The trolley 4 then moves the support mast 6 to a position where the distance measuring device 343 indicates a predetermined distance. In this position, the support mast is locked mechanically in the tangential direction by means of the locking device 20 described su in FIG. 5.

FIG. 13 shows a sectional view of the radial direction fine positioning system and FIG. 14 shows a section along the line 14—14 in FIG. 13. The system comprises a part 35 which is fixed to the trolley 4 and rotatable by means of a drive device. A nozzle 351 provided in the part 35 is able to radially displace the beam 5 to which the support mast 6 is affixed. To make radial movement possible, the connection 361 between the distance beam and the nozzle permits radial play. The distance from the extension mast 14 to the vessel wall 1 is measured with an ultrasonic distance transducer (not shown).

Figure 15:
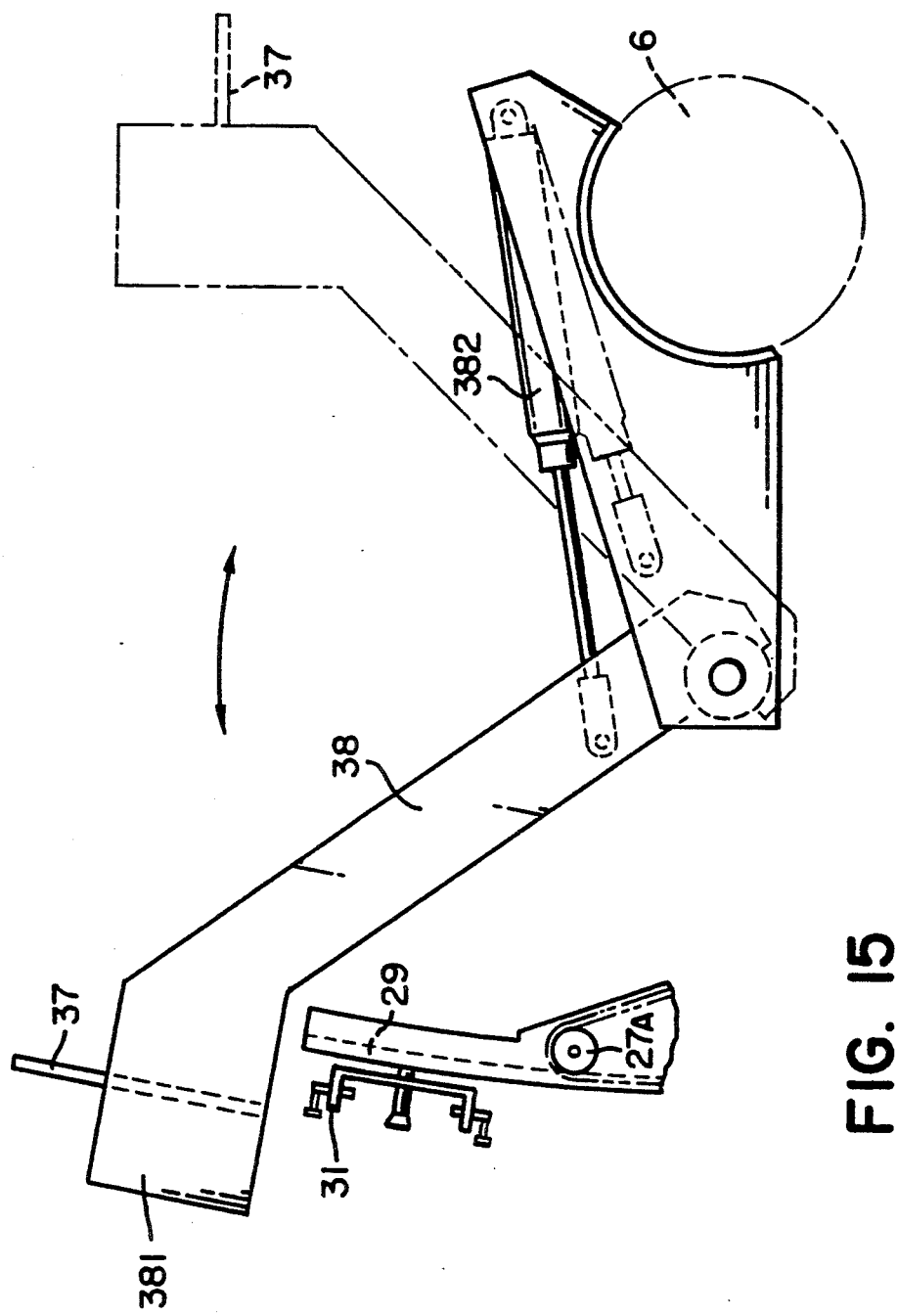
FIG. 15 depicts a top view of a device for movement of a simulation block, useable in the inspection apparatus in accordance with the present invention.
Figure 16:
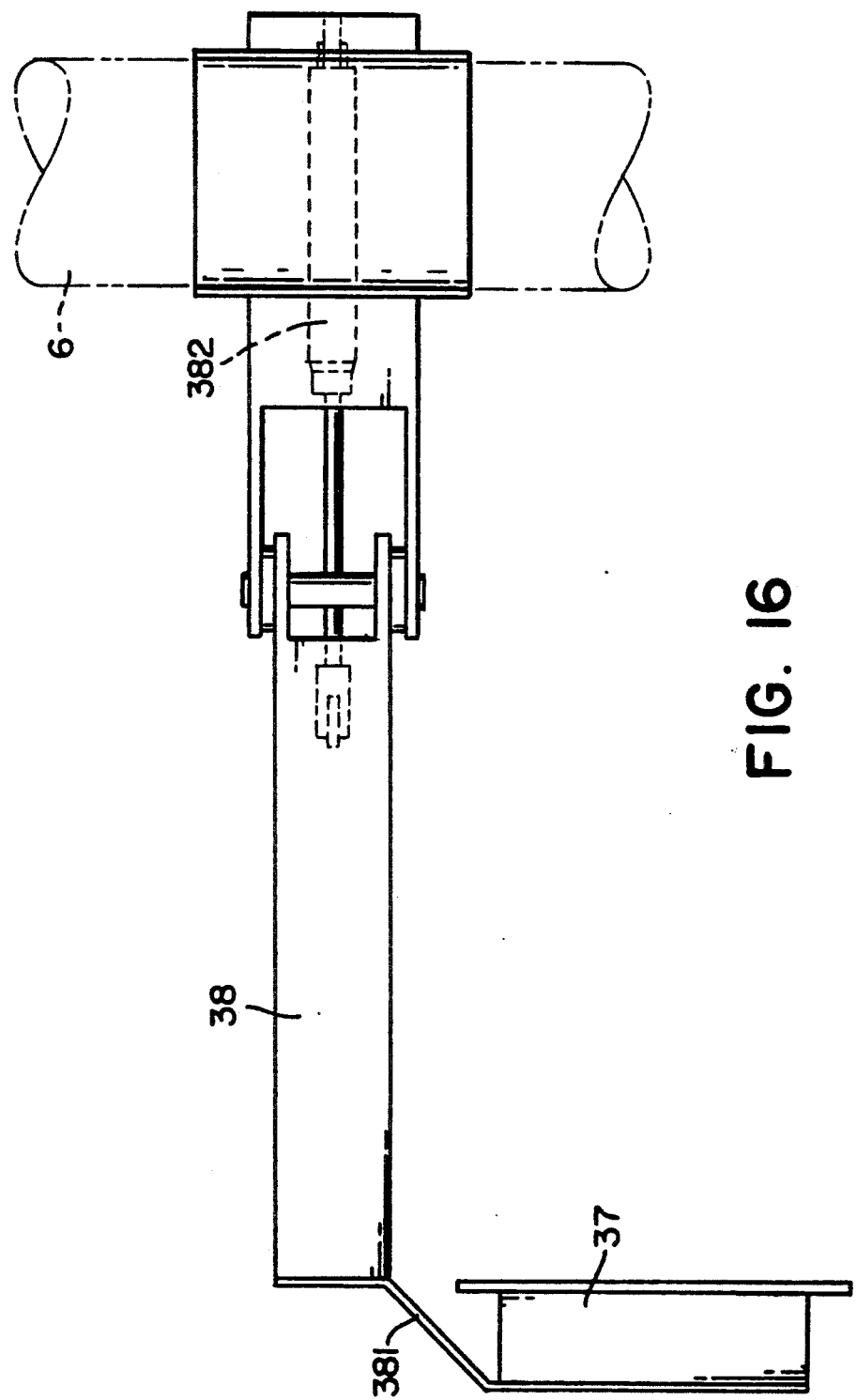
FIG. 16 depicts a side view of the device according to FIG. 15.

Inspection of all the accessible weld joints of a reactor vessel may typically take about 10 days. Test regulations require that the signal level of the probes be regularly verified. Typically verification must be done at 12 hour intervals and is usually carried out by transferring the probes to a simulation block 37, shown in FIG. 5. In order to shorten the time expenditure for moving the probes from their inspection position to the verification position, the simulation block is placed at the lower edge of the support mast, as shown in FIGS. 5, 15 and 16. The simulation block is connected to an arm 38, shown in FIG. 15, in which a holder 381 holds the simulation block 37. By means of a compressed-air cylinder 382, the arm 38 is movable between two positions, a retracted position (indicated in broken lines FIG. 15) and an extended verification position (shown in unbroken lines in FIG. 15). To perform verification, the extension mast 14 is pulled up to its upper position along the support mast 6, and the tilting device 18 is then activated. In the next step, the compressed-air cylinder 382 is activated and the simulation block is brought to the verification position. Thereafter, the horizontal trolley 29 is moved to its end position where the end effector passes by the simulation block. After verification has been performed, the horizontal trolley 29 is returned to its central position, the simulation block 37 is returned to its retracted position and the tilting device 18 is deactivated.

The trolley 4, vertical trolley 141, horizontal trolley 29, and probe position trolley 30 may all be controlled remotely by activation of individual drive devices electronically interfaced to a control location outside the reactor vessel. Therefore, operation of the apparatus and control of its functions may be accomplished independently without the need for a physical presence within the reactor.

Although the invention has been described in connection with the embodiments depicted herein. It will be apparent to one skilled in the art that various modifications, substitutions and equivalents may be used in connection with these embodiments. Any such variations are intended to be within the scope of the invention as defined by the following claims.

What is claimed is:

1. An apparatus for inspection of a reactor vessel comprising:
   a support mast;
   a first trolley for supporting the support mast to the wall flange of a reactor vessel and transporting the support mast along the inside side wall of the reactor vessel;
   an extension mast capable of vertically extending below the support mast, the extension mast being translated by means of a second trolley engaged between the extension mast and the support mast;
   an end effector connected to the lower portion of the extension mast for inspecting the reactor vessel wall, said effector comprising
   a main frame;
   an upper drive device connected to the main frame;
   a lower drive device connected to the main frame;
   a horizontal trolley affixed to a rack operatively connected to the upper drive device, capable of tangential movement relative to the main frame;
   a probe position trolley on the horizontal trolley, the probe position trolley capable of moving tangentially relative to the horizontal trolley;
   a probe holder capable of securing ultrasonic probes affixed to the probe position trolley by a shaft; and
   a tilting device connected to the support mast for varying the angle between the support mast and the reactor vessel wall.

2. The apparatus for inspection of a reactor vessel according to claim 1 wherein the tilting device comprises an arm attached to the support mast; and means for altering the angle between the support mast.

3. The apparatus for inspection of a reactor vessel according to claim 2 wherein the tilting device further comprises a support wheel connected to the arm for contacting the reactor vessel wall.

4. The apparatus for inspection of a reactor vessel according to claim 1 wherein the lower drive device is adapted to rotate the probe position trolley around the shaft.

5. The apparatus for inspection of a reactor vessel according to claim 1 further comprising means for disengaging the shaft from the horizontal trolley.

6. The apparatus for inspection of a reactor vessel according to claim 5 wherein the upper drive device comprises:
   an electric motor;
   a gear box operatively engaged with the motor;
   a transmission means operatively engaged to the gear box for displacing the rack in the tangential direction.

7. The apparatus for inspection of a reactor vessel according to claim 6 further comprising:
   a support arm connecting the end effector means to the extension mast;
   a spring loaded bearing connecting the support arm to the extension mast for continuously applying a torque forcing the end effector means in a direction radially towards the reactor vessel wall;
   means for forcing the end effector means in a direction radially opposite the reactor vessel wall.

8. The apparatus for inspection of a reactor vessel according to claim 7 further comprising a locking pin affixed to the main frame and insertable into an aperture located on a front plate of the probe position trolley wherein the probe position trolley may be locked to the main frame when the pin is inserted into the aperture.

9. The apparatus for inspection of a reactor vessel according to claim 8 further comprising a rope affixed to the horizontal trolley and passing through a hole in an output shaft of the gear box of the upper drive device wherein applying a tension to the rope enables the horizontal trolley to be moved to a central position.

10. The apparatus for inspection of a reactor vessel according to claim 9 further comprising tangential direction fine positioning system.

11. The apparatus for inspection of a reactor vessel according to claim 10 wherein the tangential direction fine positioning system comprises:
    a positioning arm pivotably affixed to the lower portion of the support mast;
    means for pivotably moving the position arm in an axial direction;
    a distance measuring device affixed to the positioning arm for measuring the distance to a lug on a shroud of a reactor.

12. The apparatus for inspection of a reactor vessel according to claim 11 comprising a radial direction fine positioning system comprising a rotatable member affixed to the first trolley.

13. The apparatus for inspection of a reactor vessel according to claim 12 wherein the radial direction fine positioning system further comprises:
    a nozzle within the member, the nozzle capable of radially displacing a beam, affixed to the support mast, relative to the member.

14. The apparatus for inspection of a reactor vessel according to claim 11 further comprising a simulation block located at the lower portion of the support mast for verifying the accuracy of probe on the probe holder.

15. The apparatus for inspection of a reactor vessel according to claim 14 further comprising:
    an arm pivotably affixed to the support mast;
    means for pivotably moving the arm from a retracted position to a verification position;
    a simulation block holder located at the end of the arm for supporting the simulation block wherein said means may cause the arm to extend into the verification position such that the simulation block will interface with the probes of the end effector for verification of the probes.

16. In an apparatus for inspection of a reactor vessel having a support mast and an extension mast extendable along the inside of a reactor vessel, an end effector comprising:
    a main frame;
    an upper drive device connected to the main frame;
    a lower drive device connected to the main frame;
    a horizontal trolley affixed to a rack operatively connected to the upper drive device, the horizontal trolley capable of tangential movement relative to the main frame;

a probe position trolley affixed to the horizontal trolley, the probe position trolley capable of being moved tangentially relative to the horizontal trolley;

a probe holder capable of securing ultrasonic-type probes, the probe holder affixed to the probe position trolley by a shaft.

17. In an apparatus for inspection of a reactor having a support mast and an extension mast extendable along the inside of a reactor vessel, the end effector according to claim 16 further comprising a means for disengaging the shaft from the horizontal trolley.

18. In an apparatus for inspection of a reactor vessel having a support mast and an extension mast extendable along the inside of a reactor vessel, the end effector according to claim 17 wherein the means for disengaging the shaft from the horizontal trolley comprises a lower drive device adapted to rotate the probe position trolley around the shaft; and means for activating a spring loaded locking pin to allow rotation of the probe position trolley around the shaft.

19. In an apparatus for inspection of a reactor vessel having a support mast and an extension mast extendable along the inside of a reactor vessel, the end effector according to claim 16 wherein the upper drive device comprises:

an electric motor;

a gear box operatively engaged with the motor;

a transmission means operational engaged to the gear box for displacing the rack in the tangential direction.

20. In an apparatus for inspection of a reactor vessel having a support mast and an extension mast extendable along the inside of a reactor vessel, a tangential direction fine positioning system comprising:

a positioning arm pivotably affixed to the lower portion of the support mast;

means for pivotably moving the position arm in an axial direction;

a distance measuring device affixed to the positioning arm for measuring the distance to a lug on a shroud of a reactor.

21. In an apparatus for inspection of a reactor vessel having a support mast connected to a main trolley supporting the support mast on the wall flange of a reactor vessel and an extension mast extendable along the inside of a reactor vessel, a radial direction fine positioning system comprising:

a nozzle within a member affixed to the main trolley, the nozzle capable of radially displacing a beam, affixed to the support mast, relative to the member.

22. In an apparatus for inspection of a reactor vessel having a support mast and an extension mast extendable along the inside of a reactor vessel, a verification system comprising:

an arm pivotably affixed to the support mast;

means for pivotably moving the arm from a retracted position to a verification position;

a simulation block holder located at the end of the arm for supporting a simulation block wherein activation of the means for pivotably moving the arm may cause the arm to extend into the verification position such that the simulation block will interface with probes of an end effector for verification of the probes.

* * * * *

UNITED STATES PATENT AND TRADEMARK OFFICE
CERTIFICATE OF CORRECTION

PATENT NO. : 5,156,803

DATED : October 20, 1992

INVENTOR(S) : Alf Erik Christer Engding et al.

It is certified that error appears in the above-identified patent and that said Letters Patent is hereby corrected as shown below:

Column 4, line 2, "V-V" should be --5-5--;

Column 4, line 25, "XIV-XIV" should be --14-14--;

Column 12, line 36, after "comprising" insert --further--;

Column 13, line 11, after "reactor" insert --vessel--.

Signed and Sealed this

Fifth Day of October, 1993

Attest:

BRUCE LEHMAN

Attesting Officer

Commissioner of Patents and Trademarks